O. C. ANDERSON.
SHOCKING HOOK.
APPLICATION FILED MAR. 11, 1913.
1,086,636.
Patented Feb. 10, 1914.
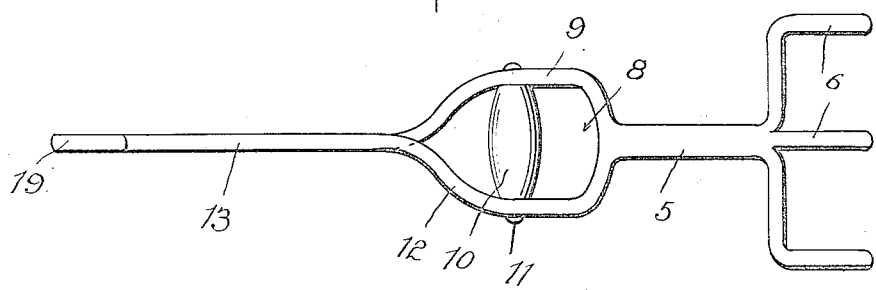
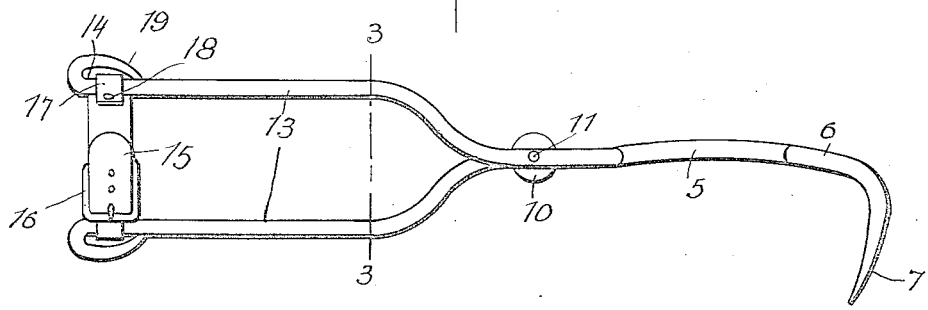
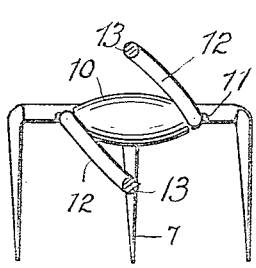
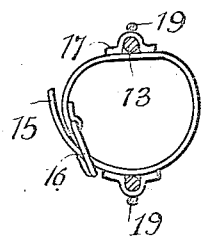
Inventor
Ole Christian Anderson
Witnesses

UNITED STATES PATENT OFFICE.

OLE CHRISTIAN ANDERSON, OF HASTINGS, MINNESOTA.

SHOCKING-HOOK.

1,086,636.

Specification of Letters Patent.

Patented Feb. 10, 1914.

Application filed March 11, 1913. Serial No. 753,596.

*To all whom it may concern:*

Be it known that I, OLE CHRISTIAN ANDERSON, a citizen of the United States, residing at Hastings, in the county of Dakota and State of Minnesota, have invented certain new and useful Improvements in Shocking-Hooks; and I do hereby declare the following to be a full, clear, and exact description of the invention, such as will enable others skilled in the art to which it appertains to make and use the same.

This invention relates to new and useful improvements in shocking hooks, and has for its object to provide a device to be used in handling bundles of corn, etc., in the field.

Another object is to provide a hook which will eliminate the necessity of the hand coming in contact with a bundle when the same is being loaded onto or unloaded from a wagon.

Heretofore it has been the practice for the workman to handle the bundles entirely by hand and it has necessitated a great deal of discomfort as the sharp edges of the leaves are apt to cut the flesh.

With a view to eliminating the above discomfort, I provide my new and improved shocking hook which will be more fully described in the annexed specification and drawings, in which—

Figure 1 is a top plan view of my improved device. Fig. 2 is a side view of the same. Fig. 3 is a sectional view taken on line 3—3 of Fig. 2, and Fig. 4 is a sectional view showing in detail my strap attaching means.

Referring to the drawings by characters of reference, 5 indicates the main body portion of my improved hook, prongs 6 being provided at one terminal thereof and being extended downwardly, as shown at 7, thereby forming a hook end. This body portion 5 is slightly arched, as clearly shown in Fig. 2, and at the opposite terminal is bifurcated, as shown at 8, to form a handle. This handle is preferably formed of the arms 9 which are connected by means of a grip 10 which is attached thereto by means of a rivet or bolt, as shown at 11. These arms are extended and bent, as clearly shown at 12, so that their plane of alinement is at substantially right angles to the handle 10. They are then extended parallel to each other, as shown at 13, and their terminals bent back upon themselves at 14 to form loops or eyes to which an attaching strap is adapted to be fixed. An attaching strap 15 having at one terminal thereof a buckle 16 by means of which the same is adjusted is provided intermediate its ends with loops 17 which are fastened thereto by means of rivets 18, these loops being passed beneath the ends 19 of the extension 13.

In use, the operator's hand is slipped into the loop formed by the strap 15 and between the forks formed by the extensions 13 and forward to the grip 10 which is held firmly in the hand. The strap 15 is then tightened to hold the same to the arm and the device is then ready for use.

While in the foregoing, I have shown and described the preferred embodiment of my invention, I wish it to be understood that I may change the specific arrangements of parts without in any way departing from the spirit and scope of my invention.

Having thus fully described my invention, what I claim is:—

1. A shocking hook comprising a body portion, hooks formed at one end thereof, arms integral with the opposite end of said body portion, a handle rigidly fixed intermediate said arms, extensions projecting rearwardly from the said arms and being provided at their terminals with a means to attach the device to an operator's arm.

2. In a shocking hook, a body portion, hooks formed at one end thereof and integral therewith, arms at the opposite ends of the hooks and extending rearwardly therefrom, said arms being connected by means of a grip, extensions formed integral with said arms and projecting rearwardly therefrom, loops formed at the end of said extension adapted to receive loops on a substantially circular strap, and means attached to said strap to provide for adjustment thereof.

3. In a device of the character described, a handle extending in a substantially horizontal plane, projections extending rearwardly therefrom, the said projections being in a substantially vertical plane with relation to each other, and means at the opposite end of said handle to form hooks.

4. In a device of the character described, a body portion having hooks at one end thereof, a substantially horizontal handle formed at the opposite end of said body portion, extensions extending rearwardly from said handle in a plane at substantially right angles thereto, and means at the opposite terminals of said extensions to attach the same to an operator's arm.

In testimony whereof I affix my signature in presence of two witnesses.

OLE CHRISTIAN ANDERSON.

Witnesses:
CHAS. DOFFING,
THEO. COOK.